United States Patent
Bonvin et al.

(10) Patent No.: US 8,854,765 B2
(45) Date of Patent: Oct. 7, 2014

(54) REGULATING DISTRIBUTION OF POWER IN A HARD DISK DRIVE FOLLOWING A POWER LOSS

(71) Applicants: STMicroelectronics Asia Pacific Pte. Ltd., Singapore (SG); STMicroelectronics S.r.l., Agrate Brianza (IT)

(72) Inventors: Frederic Bonvin, Longmont, CO (US); Davide Betta, Barzano' (IT); Seng-Chean Hong, Singapore (SG)

(73) Assignees: STMicroelectronics Asia Pacific Pte. Ltd., Singapore (SG); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/781,908

(22) Filed: Mar. 1, 2013

(65) Prior Publication Data

US 2014/0247517 A1 Sep. 4, 2014

(51) Int. Cl.
*G11B 21/02* (2006.01)
*G11B 33/12* (2006.01)

(52) U.S. Cl.
CPC ...................................... *G11B 33/12* (2013.01)
USPC .......................................................... 360/75

(58) Field of Classification Search
None
See application file for complete search history.

(56) References Cited

U.S. PATENT DOCUMENTS

| | | | | |
|---|---|---|---|---|
| 4,679,102 A * | 7/1987 | Wevers et al. | ................... | 360/75 |
| 4,692,829 A * | 9/1987 | Campbell | ................... | 360/256.1 |
| 4,786,995 A * | 11/1988 | Stupeck et al. | ................... | 360/75 |
| 5,124,867 A * | 6/1992 | Kitahori et al. | ............ | 360/256.1 |
| 5,982,570 A * | 11/1999 | Koizumi et al. | ................. | 360/69 |
| 6,316,898 B1 * | 11/2001 | Albrecht et al. | .............. | 318/560 |
| 6,566,832 B2 | 5/2003 | Ataee | | |
| 6,567,232 B1 * | 5/2003 | Klaassen | .......................... | 360/75 |
| 7,006,320 B1 * | 2/2006 | Bennett et al. | ............. | 360/73.03 |
| 7,193,804 B1 | 3/2007 | Kheymehdooz | | |
| 7,852,028 B1 * | 12/2010 | Hong et al. | .............. | 318/400.34 |
| 8,432,775 B2 * | 4/2013 | Miyagoe et al. | ............ | 369/47.38 |
| 2002/0141102 A1 * | 10/2002 | Kusumoto | ....................... | 360/75 |
| 2003/0151992 A1 * | 8/2003 | Fujimoto et al. | ............ | 369/47.14 |
| 2003/0212857 A1 * | 11/2003 | Pacheco et al. | ................. | 711/114 |
| 2004/0212332 A1 * | 10/2004 | Nakabayashi | ................... | 318/62 |
| 2005/0218846 A1 * | 10/2005 | Moser et al. | ................... | 318/376 |
| 2006/0007581 A1 * | 1/2006 | Brenden et al. | ................. | 360/75 |
| 2006/0164749 A1 * | 7/2006 | Yamamoto | ....................... | 360/75 |
| 2010/0165811 A1 | 7/2010 | Bonvin | | |
| 2010/0302664 A1 * | 12/2010 | Heo et al. | ......................... | 360/31 |

\* cited by examiner

*Primary Examiner* — Peter Vincent Agustin (74) *Attorney, Agent, or Firm* — Seed IP Law Group PLLC (57) ABSTRACT

Applicant has recognized and appreciated the desirability of powering an actuator using power drawn from one or both of an energy storage device and a spindle motor. In some embodiments, following a loss of external power to a hard disk drive, the hard disk drive (or one or more components thereof) determines whether to provide the actuator with power drawn from the spindle motor or to provide the actuator with power drawn from the spindle motor and from the energy storage device. In some embodiments, the hard disk drive (or the component(s) thereof) may additionally or alternatively determine whether to charge the energy storage device using power drawn from the spindle motor. In some embodiments, the drive may make the determinations based on an amount of power that the actuator is to consume at a time and an amount of power that the spindle motor can provide at the time.

35 Claims, 8 Drawing Sheets

REGULATING DISTRIBUTION OF POWER IN A HARD DISK DRIVE FOLLOWING A POWER LOSS

BACKGROUND

Figure 1:
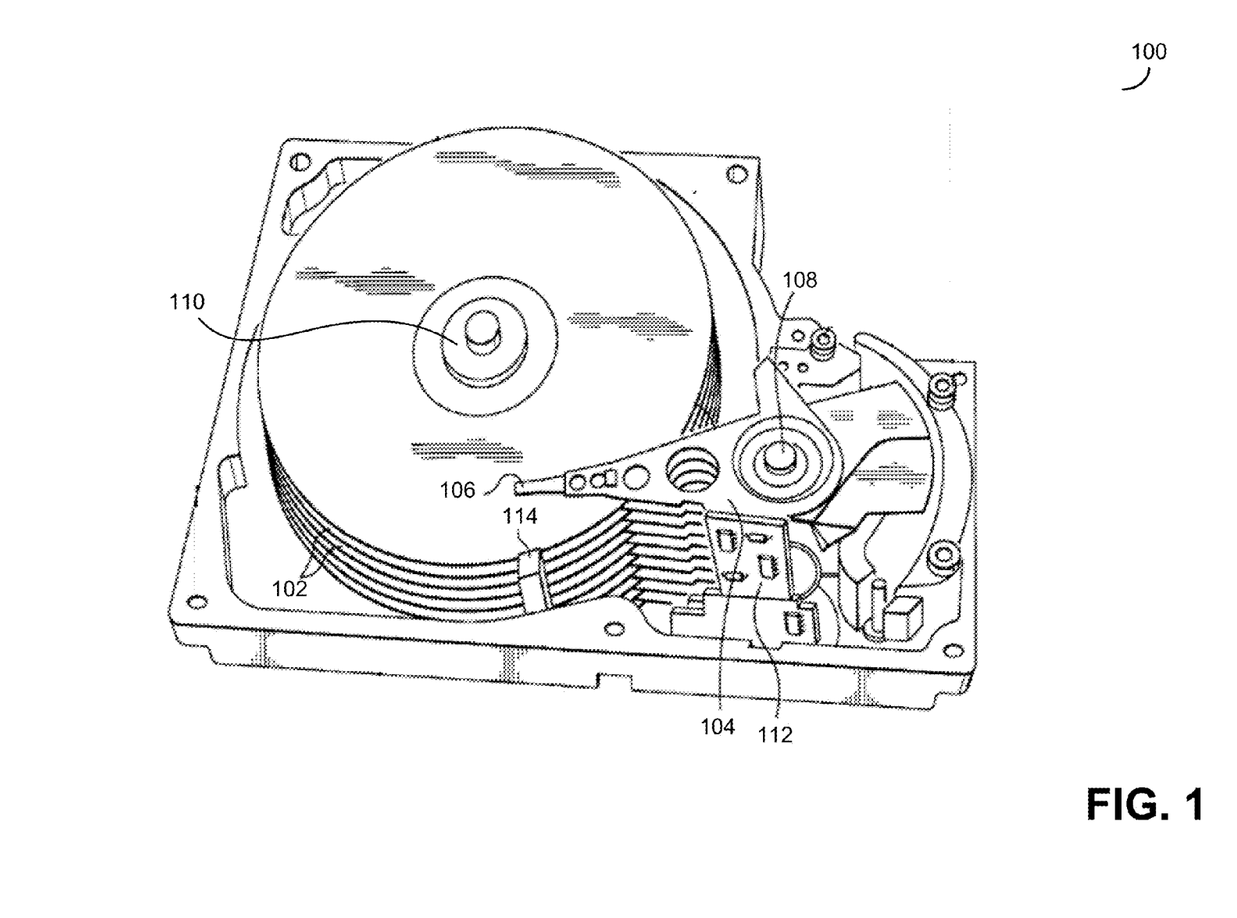
FIG. 1 is a sketch of some components of a conventional hard disk drive.

Hard disk drives are computer-readable storage media that can be used by computing devices to store information for later use and retrieval. FIG. 1 illustrates an example of a hard disk drive 100. The hard disk drive 100 stores information on one or more circularly-shaped platters 102, which include a material that can maintain a magnetic state. Information is written to a portion of a platter 102 by changing a magnetic state of the portion and information can be read from the platter 102 by detecting a magnetic state of a portion.

The hard disk drive 100 includes one or more devices 106 to read information from and write information to a platter 102. The devices 106, which are called magnetic heads herein, are may be mounted on one end of a structure 104 that extends over the platters 102. This structure 104 on which the magnetic heads 106 are mounted is referred to herein as an actuator arm. When the hard disk drive 100 is operating, the actuator arm 104 is driven by a motor (referred to herein as an actuator) 108 such that the end of the arm 104 (and thus the magnetic heads 106) moves toward and away from a center of the circularly-shaped platters 102. During operation of the hard disk drive 100, the platters 102 are driven to rotate by a motor 110, which is referred to herein as a spindle motor 110. By rotating the platters 102 and moving the magnetic head(s) 106 toward a center of the platters 102 or toward an edge of the platters 102, the magnetic heads 106 may read information from and/or write information to different portions of the platters 102.

The platters 102 and the magnetic heads 106 are each made of materials that may be easily damaged if contacted. As a result, the actuator arm 104 is structured to keep the magnetic heads 106 suspended close to, but not touching, the platters 102. During normal operation of the hard disk drive 100, the spindle motor 110 drives the platters 102 to rotate relatively quickly. Some contemporary hard disk drives, for example, rotate platters at 7600 rotations-per-minute (rpm). This movement of the platters 102 causes a movement of air on the surface of the platters 102. The actuator arm 104 has a shape that enables the actuator arm 104 to be suspended over the platters 102 by this movement of air, such that the actuator arm 104 does not need to support itself over the platters 102 and does not need additional support structures.

From time to time, the hard disk drive 100 receives an instruction from a computing device to stop rotating the platters 102. The computing device may transmit the instruction when the computing device is undergoing a power transition, such as when the compute device is to be placed into an off state or a power-saving state. When the platters 102 stop moving, the movement of air will also stop and thus will no longer suspend the actuator arm 104 over the platters 102. If the actuator arm 104 is over the platters 102 when the platters 102 stop moving, the actuator arm 104 could fall onto the platters, resulting in damage to the platters 102 and/or to the magnetic heads 104. Accordingly, when the hard disk drive 100 receives an instruction to stop rotating the platters 102, a control circuit 112 included in the hard disk drive 100 will, in response to the instruction, control the actuator 108 to drive the actuator arm 104 away from the platters 102 and to a resting position 114. The actuator 108 drives the actuator arm 104 to the resting position 114 before the platters 102 stop moving, which means that the movement of air suspends the arm 104 above the platters 102 while the arm 104 is being moved to the resting position 114 and that the heads 106 will not contact and damage the platters 102.

Therefore, under normal operation, the hard disk drive 100 receives an instruction prior to stoppage of the rotation of the platters 102 and, in response to the instruction, the actuator arm 104 is moved to a resting position 114 away from the platters 102.

In the case of a sudden loss of external power to the hard disk drive 100, however, the spindle motor 110 will not be powered and will not be able to drive rotation of the platters 102. In this case, the platters 102 will stop moving, but the hard disk drive 100 will often not have received an instruction to stop the rotation of the platters 102. If the actuator arm 104 is above the platters 102 when external power is lost, the actuator arm 104 must be moved away from the platters 102, to the resting position 114, before damage results. If the platters 102 are rotating at the time that external power is lost, due to inertia the platters 102 may continue to rotate for a short time period, which will create a movement of air for the short time period. If the actuator arm 104 is moved to the resting position 114 before the end of the short time period, the actuator arm 104 will be suspended by the movement of air and there would be no damaging contact between the magnetic heads 106 and platters 102.

Of course, in the event of a loss of external power, there is no external power available for driving the control circuit 112 or the actuator 108 during the short time period. Several techniques have therefore been proposed for providing power to the control circuit 112 and actuator 108 during the short time period.

Figure 2:
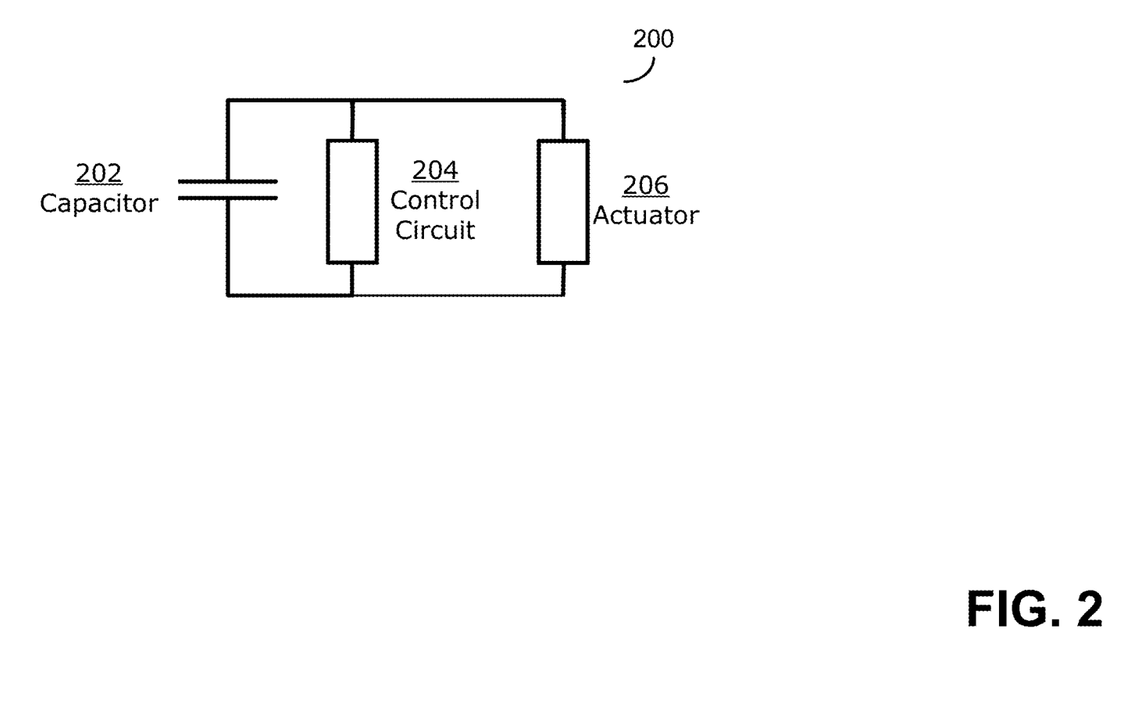
FIG. 2 is a block diagram of an example of a circuit that may be used for powering an actuator and a control circuit of a hard disk drive following loss of external power to the hard disk drive.

FIG. 2 illustrates a first example of a way to provide power to an actuator and a control circuit. FIG. 2 illustrates a circuit 200 for driving an actuator arm in the event of a loss of external power to a hard disk. In the example of FIG. 2, the circuit 200 includes a capacitor 202 that is charged during operation of the hard disk and, following a power loss, the capacitor 202 provides power to the control circuit 204 and to the actuator 206. The capacitor 202 provides all power to the control circuit 204 and to the actuator 206 during the time period between the loss of external power and the actuator arm reaching the resting position.

Figure 3:
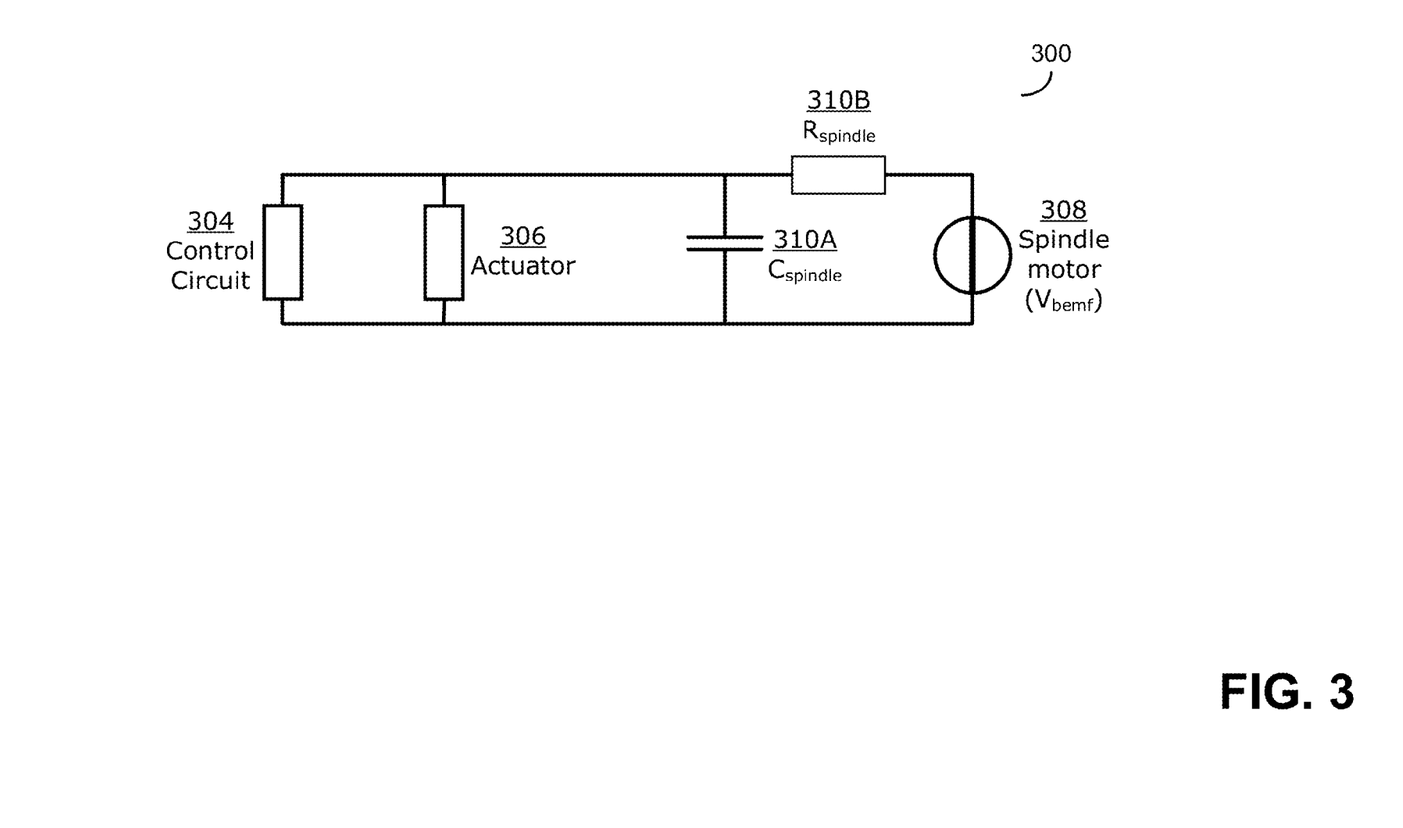
FIG. 3 is a block diagram of a second example of a circuit that may be used for powering an actuator and a control circuit of a hard disk drive following loss of external power to the hard disk drive.

FIG. 3 illustrates a second example of a way to provide power to an actuator and a control circuit. In the circuit 300 of FIG. 3, the spindle motor 308 (illustrated as a DC equivalent of a spindle motor) of the circuit is operated as a power source for the circuit 300. The spindle motor 308 drives rotation of the platters of the hard disk during normal operation of the hard disk drive. Following a loss of external power, the platters and the spindle motor 308 will continue to rotate due to inertia. The rotating of the motor 308 due to the inertia will create electrical power due to the "back electromotive force," designated as $V_{bemf}$ in FIG. 3. This power can be drawn from the motor 308 and used to power the circuit 300. Some of the power created by the spindle motor 308 will be consumed by the motor 308 and electrical characteristics of the motor 308, which are modeled in FIG. 3 as the components 310A, 310B. Remaining power can be drawn from the motor 208 and used to power the control circuit 304 and the actuator 306 during the short period.

Figure 4:
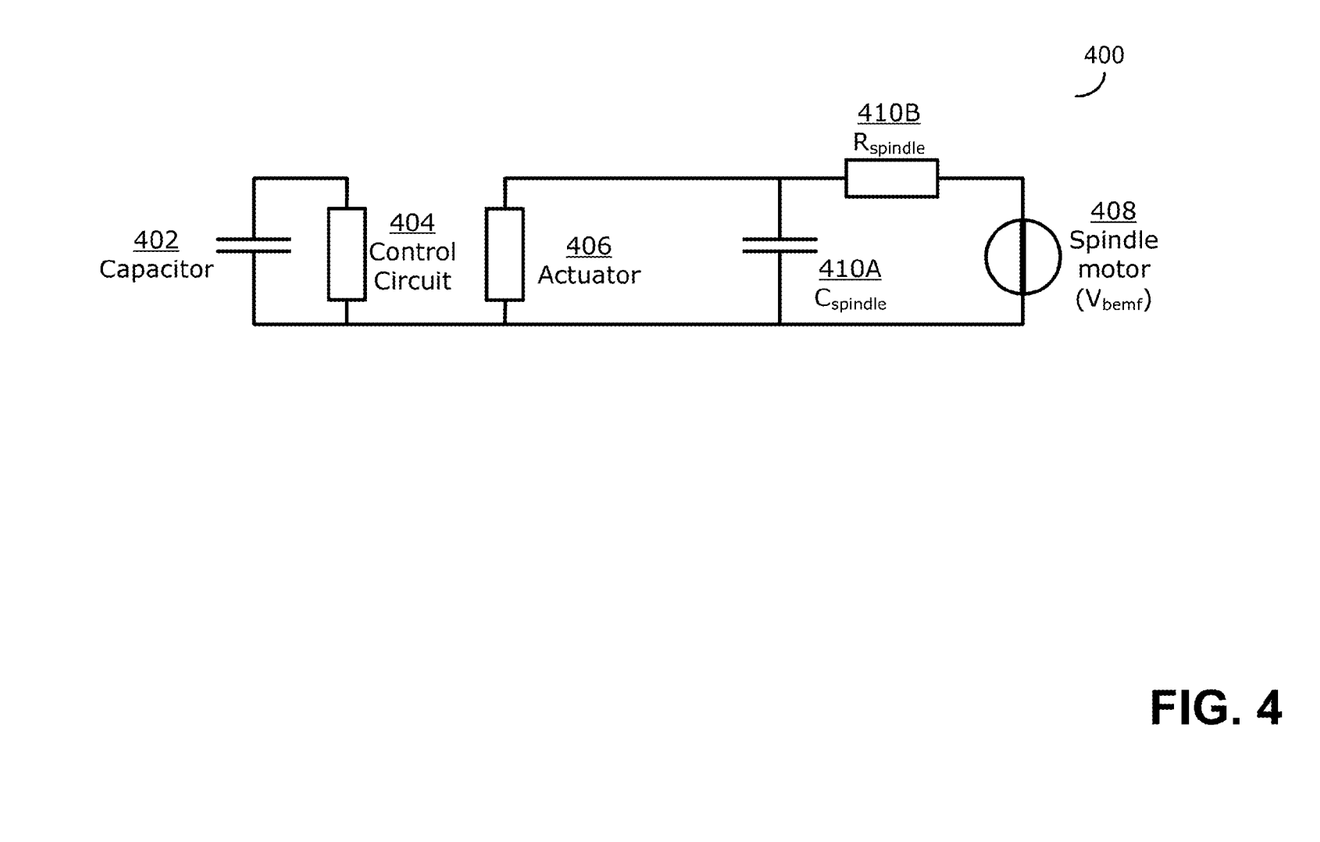
FIG. 4 is a block diagram of a third example of a circuit that may be used for powering an actuator and a control circuit of a hard disk drive following loss of external power to the hard disk drive.

FIG. 4 illustrates a third example of a way to provide power to an actuator and a control circuit. FIG. 4 illustrates a circuit 400 that can be considered a blend of the circuits illustrated in FIGS. 2 and 3. The circuit 400 includes a capacitor 402 that is charged during operation of the hard disk and, following a power loss, provides power to the control circuit 404. The circuit 400 also includes a spindle motor 408 (illustrated as a DC equivalent of the spindle motor 408) from which power can be drawn following a loss of external power, as discussed above in connection with FIG. 3. Some of the power drawn from the spindle motor 408 may be consumed by the motor 408 according to electrical characteristics of the motor 408, as modeled by components 410A, 410B illustrated in FIG. 4. The power drawn from the motor 408 is used to power the actuator 406.

SUMMARY

In one embodiment, there is provided a method of operating a hard disk drive in response to a loss of external power to the hard disk drive. The hard disk drive includes a spindle motor to drive rotation of a plurality of platters, and further includes an actuator to drive an actuator arm and a control circuit to control the actuator. The hard disk drive further includes an energy storage device. The method comprises determining a first amount of power to be used by the actuator for driving the actuator arm at a time and, when a second amount of power that can be drawn from the spindle motor at the time is greater than the first amount of power to be used by the actuator for driving the actuator arm at the time, charging the energy storage device with power drawn from the spindle motor.

In another embodiment, there is provided a method of operating a hard disk drive in response to a loss of external power to the hard disk drive. The hard disk drive includes a spindle motor to drive rotation of a plurality of platters, and further includes an actuator to drive an actuator arm and a control circuit to control the actuator. The hard disk drive further includes an energy storage device. The method comprises comparing a first amount of power to a second amount of power, where the first amount of power is an amount of power to be used by the actuator for driving the actuator arm at a time and the second amount of power is an amount of power that can be drawn from the spindle motor at the time. The method further comprises, when the second amount of power is greater than or equal to the first amount of power, powering the actuator using power drawn from the spindle motor and, when the second amount of power is less than the first amount of power, powering the actuator using power drawn from the spindle motor and from the energy storage device.

In a further embodiment, there is provided a hard disk drive comprising a power input to receive power from a power source, a plurality of platters, a spindle motor to drive rotation of the plurality of platters, an actuator arm having, at one end, at least one device to read data from and/or write data to the plurality of platters, an actuator to drive movement of the actuator arm, a first control circuit to control operation of the actuator, an energy storage device, and a second control circuit configured to select whether to drive the actuator using power drawn from the spindle motor or using power drawn from the spindle motor and power drawn from the energy storage device, in response to a loss of power from the power source.

In another embodiment, there is provided an apparatus for use in an environment comprising a hard disk drive. The apparatus comprises a control circuit arranged to provide power to an actuator for driving an actuator arm, wherein the control circuit is arranged to select between providing the actuator with power drawn from a spindle motor and providing the actuator with power drawn from the spindle motor and from an energy storage device.

In a further embodiment, there is provided an apparatus for use in an environment comprising a hard disk drive. The apparatus comprises a control circuit arranged to determine a first amount of power to be used by an actuator for driving an actuator arm at a time and to, in a case that a second amount of power that can be drawn from a spindle motor at the time is greater than the first amount of power to be used by the actuator for driving the actuator arm at the time, charge an energy storage device with power drawn from the spindle motor.

In another embodiment, there is provided a circuit for regulating a distribution of power in a hard disk drive. The circuit comprises a power input to receive power generated by a first motor of the hard disk drive an energy storage device, a first output to output power to a control circuit that controls a second motor of the hard disk drive, the control circuit being electrically connected to the energy storage device, a second power output to output power to the second motor, the second power output being electrically connected to the power input, a first switch electrically connected between the energy storage device and the second output such that, when the first switch is closed, power from the energy storage device will be output via the second power output, and at least one circuit element to control a state of the first switch.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various techniques have been proposed for powering an actuator and a control circuit following a loss of external power to a hard drive. Some techniques have been discussed above in connection with FIGS. 2-4. Applicant has recognized and appreciated that there are various disadvantages to each of these techniques.

The technique illustrated in FIG. 2, for example, includes a capacitor that is charged during operation of the hard disk drive and, following the loss of external power, powers the control circuit and the actuator. Applicant has recognized and appreciated that, to store enough energy to power the control circuit and the actuator following a loss of external power, the capacitor must be large and capable of storing a great deal of energy. Applicant has recognized and appreciated that such capacitors are disadvantageous at least because they are costly. Applicant has additionally recognized and appreciated that there is a trend in the industry toward smaller devices and, therefore, smaller hard disk drives. In some cases, a large capacitor may undesirably increase the size of a hard disk drive or prevent further miniaturization of the hard disk drive, and may undesirably increase a cost of the hard disk drive.

The technique illustrated in FIG. 3 includes a circuit for drawing electrical energy from a spindle motor that is created by the rotational inertia of the spindle motor. Applicant has recognized and appreciated that the energy that may be recovered from the spindle motor at any given time may not be sufficient to drive both the control circuit and the actuator for an entirety of a time until the actuator arm reaches a resting position. This may be so for at least two related reasons. First, the spindle motor may provide less energy over time, as the spindle motor slows and loses rotational momentum. Second, the actuator may require more energy over time to drive the actuator arm. For example, some hard disk drives may include a ramp that separates the resting position for the actuator arm from the platters. For the actuator arm to reach the resting position in these drives, the actuator needs to drive the actuator arm up the ramp. This means that the actuator will need more power once the actuator arm has moved to an edge of the platters and is to be driven up the ramp, which may be a relatively long time after the loss of external power to the hard disk drive. Thus, at a time that the actuator needs more energy, the spindle motor may be slowing and may not be able to provide the electrical energy needed for the actuator to drive the actuator arm up the ramp.

With respect to the technique illustrated in FIG. 3, Applicant has also recognized and appreciated that the technique may be disadvantageous because of the trend in the industry toward smaller hard disk drives. As the hard disk drives shrink, the spindle motor and the platters also shrink. Smaller motors and platters have smaller mass and, therefore, less rotational momentum when they are rotating following a loss of power to the hard disk drive. When the motor and platters have less rotational momentum, less electrical power can be drawn from the spindle motor following a loss of external power to the hard disk drive. Thus, it may be the case in some hard disk drives that the energy that can be drawn from a smaller spindle motor may be insufficient for powering the control circuit and the actuator.

The third technique, illustrated in FIG. 4, mitigates some of the problems associated with the first and second techniques by powering the control circuit using a capacitor and powering the actuator using power drawn from the spindle motor. Applicant has recognized and appreciated, however, that the technique of FIG. 4 does not solve the problems of FIGS. 2 and 3. While the capacitor 402 of FIG. 4 may be smaller than the capacitor 202 of FIG. 2 (as the capacitor 402 is required to store enough energy only to power the control circuit 404), the capacitor 402 may still be too large or too costly in some cases. Additionally, while the power drawn from the spindle motor 408 will only be used to power the actuator 406 and not the control circuit 404, in some cases the spindle motor 408 may not be able to provide sufficient power to drive the actuator. For example, due to continuing miniaturization of hard disk drives mentioned above and/or to the amount of power that is to be used to drive an actuator arm up a ramp to a resting position, the spindle motor 408 may not be able to provide sufficient power at all times to drive the actuator.

In view of the foregoing, Applicant has recognized and appreciated the desirability of, following loss of external power to a hard disk drive, powering an actuator using one or both of power drawn from an energy storage device and from a spindle motor. In some embodiments, following the loss of external power, the hard disk drive (or a component thereof) may provide to a control circuit, which governs operations of the actuator, electrical power drawn from the energy storage device. Additionally, in some embodiments, the hard disk drive may determine whether to provide the actuator with power drawn from the spindle motor or to provide the actuator with power drawn from the spindle motor and with power drawn from the energy storage device. In some embodiments, the hard disk drive may additionally or alternatively determine whether to charge the energy storage device using power drawn from the spindle motor. A hard disk drive (or one or more components thereof) may make one or both determinations based on any suitable factors, including an amount of power that is to be provided to an actuator at a time and/or an amount of power that can be drawn from the spindle motor at the time.

In some embodiments, a circuit included in the hard disk drive may compare a power to be provided to the actuator, for driving the actuator arm, at a time and a power that can be drawn from the spindle motor at the time. If the circuit determines that the power to be provided to the actuator at the time exceeds the amount of power that can be drawn from the spindle motor, the circuit may select to provide to the actuator power that was drawn from both the spindle motor and the energy storage device. If, however, the circuit determines that the power to be provided to the actuator at the time does not exceed the amount of power that can be drawn from the spindle motor, the circuit may select to power the actuator using power drawn from the spindle motor and not from the energy storage device.

Additionally or alternatively, in some embodiments, the circuit may compare the power to be provided to the actuator at a time and a power that can be drawn from the spindle motor at a time to determine whether to charge the energy storage device. If the circuit determines that the power to be provided to the actuator at the time is less than the amount of power that can be drawn from the spindle motor at the time, the circuit may select to charge the energy storage device using power that can be drawn from the spindle motor. Accordingly, in these embodiments, in the case that the power that can be drawn from the spindle motor at a time exceeds the amount of power that is to be provided to the actuator at that time, power drawn from the spindle motor may be provided to both the actuator and the energy storage device. If, however, the circuit determines that the amount of power to be provided to the actuator at a time is equal to or greater than the amount of power that can be drawn from the spindle motor at the time, the circuit may elect not to charge the energy storage device using power drawn from the spindle motor.

Applicant has recognized and appreciated that in some drives, as discussed above, neither an energy storage device of a hard disk drive nor a spindle motor of a hard disk drive may be able to provide sufficient power at all times following a loss of external power for a control circuit and an actuator to properly function. Applicant has additionally recognized and appreciated, however, that an energy storage device may be able to provide sufficient power for the control circuit to operate following a loss of external power, that the spindle motor may be able to provide sufficient power for the actuator to operate at many times following a loss of external power, and that at some of these times the power that can be drawn from the spindle motor may exceed the power that is to be provided to the actuator. Applicant has therefore recognized and appreciated that there may be, at some times following a loss of external power, excess power available from the spindle motor and that, if this power is stored in the energy storage device, this power could be subsequently provided from the energy storage device to the actuator at a time that the power that can be drawn from the spindle motor is insufficient for proper operation of the actuator at that time. In this way, the energy storage device may from time-to-time supplement the spindle motor in providing power to the actuator and, from time-to-time, the spindle motor may charge the energy storage device. Applicant has additionally recognized and appreciated that, by charging the energy storage device from time-to-time following the loss of external power to the hard disk drive using power drawn from the spindle motor, the amount of energy that the energy storage device needs to have stored at the time that the external power is lost can be reduced. As a result, a size of the energy storage device can be reduced, which may be advantageous in some cases as it may reduce a cost of the energy storage device or may enable a hard disk drive to be miniaturized.

Examples of hard disk drives and circuits that implement techniques discussed above are described in detail below. It should be appreciated, however, that other embodiments are possible and that embodiments are not limited to operating in accordance with any of the examples below.

In some examples given below, a hard disk drive (or one or more components of a hard disk drive) may measure or otherwise determine a power that is to be provided to an actuator at a time and may measure or otherwise determine a power that can be drawn from a spindle motor at the time. In response to these measurements/determinations, the hard disk drive may regulate a distribution of power. It should be appreciated, however, that in some embodiments a hard disk drive may not measure or determine the power to be provided to an actuator or that can be drawn from a spindle motor. In some such embodiments, examples of which are described below, the hard disk drive may regulate a distribution of power without measuring power. In other embodiments, a hard disk drive may measure or otherwise determine a power to be provided to the actuator at a time, but may not measure a power that can be drawn from a spindle motor at the time. A hard disk drive may be arranged to regulate the distribution of power in particular ways at particular times following a loss of external power to the hard disk drive, based on prior knowledge about how power will be used or will be available following the loss of external power. A hard disk drive may be arranged to regulate the distribution of power via executable instructions that, when executed by one or more processors, cause power to be regulated in particular ways at the times they are executed. A hard disk drive may additionally or alternatively be arranged through a particular connection of electrical components, such that when nodes of a circuit are at particular voltages following a loss of external power, a current path is created via one or more electrical components to cause power to be regulated in particular ways. Embodiments are not limited to regulating the distribution of power in a hard disk drive in any particular way following a loss of external power.

Figure 5:
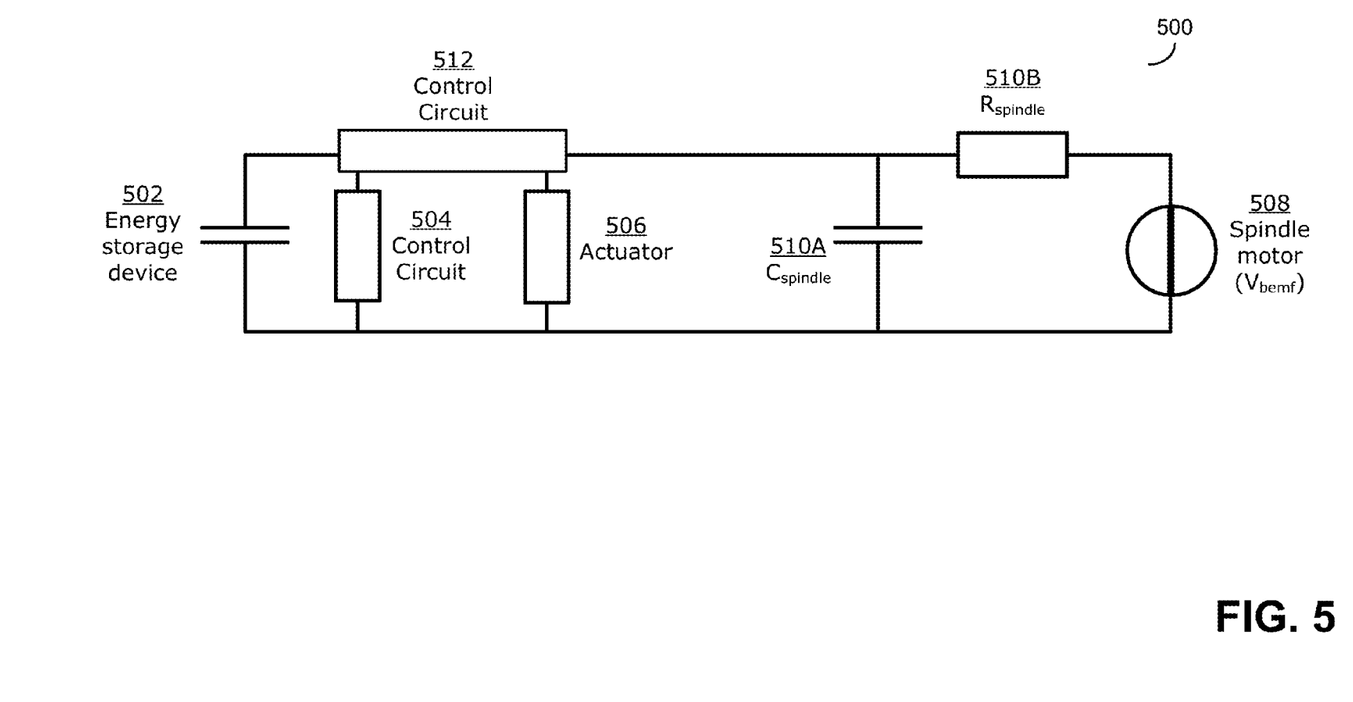
FIG. 5 is a block diagram of a circuit that may be used in some embodiments for regulating the provision of power to an actuator and to a control circuit of a hard disk drive following loss of external power to the hard disk drive.

FIG. 5 is a block diagram of some components of a circuit 500 that is implemented in accordance with some of the techniques described herein. The circuit 500, including the control circuit 512, may be used to regulate a distribution of power following a loss of external power to the hard disk drive and during a time that no external power is provided to the hard disk drive. During normal operation of the hard disk drive, at least some of the components of the circuit 500 may be provided with power received from an external power source. For example, the control circuit 504, actuator 506, spindle motor 508, and energy storage device 502 may receive power from the external power source. In a case that the hard disk drive receives an instruction to stop rotating the platters, such as an instruction received from a computing device undergoing a power state transition, these components will continue to be powered by the external power source. In some situations, however, the hard disk drive may suddenly lose external power, such as when a user shuts down a computing device without instructing the computing device to carry out a power state transition, when a user unplugs the hard drive and/or computing device or removes a battery of the hard drive or computing device, or during a power blackout when a room or building in which the hard drive and/or computing device is located loses power. Following a loss of external power to the hard disk drive, including a loss when an instruction to stop rotating the platters has not been received, the control circuit 512 of the circuit 500 may be used to power components of the hard disk drive such that an actuator arm is moved to a resting position and the hard disk drive is not damaged.

Accordingly, while all components of a hard disk drive are not illustrated in FIG. 5, the circuit 500 of FIG. 5 may be implemented together with a hard disk drive to control elements of the hard disk drive responsive to a loss of external power in the hard disk drive. In some embodiments, the circuit 500 may be implemented entirely within the housing of a hard disk drive, while in other embodiments at least some of the components of the circuit 500 may be implemented separate from the hard disk drive and outside of the housing. For example, the control circuit 512 may be implemented outside of the housing of the hard disk drive.

Additionally, it should be appreciated that the hard disk drives with which the circuit 500 may be implemented may be any suitable hard disk drives, as embodiments are not limited in this respect. The circuit 500 may be used, for example, with internal drives that are disposed within a housing of a computing device (e.g., within a housing of a desktop personal computer, laptop personal computer, personal entertainment device such as a music player, a set-top box for use with a television, a video gaming system, or other computing device that may store information for later retrieval). The circuit 500 may also be used, for example, with external drives that are disposed outside the housing of a computing device and connected via one or more wires and/or wirelessly to the computing device.

The circuit 500 includes an energy storage device 502. The energy storage device 502 may be implemented as any suitable device (or combination of devices) for storing energy and outputting electrical power. In some embodiments, the energy storage device 502 may be implemented as a capacitor or a set of multiple capacitors. Embodiments are not, however, limited to operating with any particular type of energy storage device.

During operation of the hard disk drive, the hard disk drive may provide power to the energy storage device. For example, some of the power received by the hard disk drive from an external power source may be provided to the energy storage device 502 and stored in the energy storage device 502. As discussed below, following loss of power to the hard disk drive, the energy storage device may be used to power the control circuit 504 and/or the actuator 506 and may, at times, be charged with power drawn from the spindle motor 508.

The circuit 500 also includes a control circuit 504 and an actuator 506. The control circuit 504 governs operations of the actuator 506. For example, the control circuit 504 controls the actuator 506 to move an actuator arm to a resting position, including by varying a power consumed by the actuator 506 and thereby adjusting a force with which the actuator arm is moved by the actuator 506. In some embodiments, the control circuit 504 may operate to drive the actuator 506 to move the arm to the resting position under any circumstances, including when the hard disk drive receives an instruction to stop rotating the platters. In these embodiments, the control circuit 504 may be configured to receive and respond to an instruction to move the actuator arm to the resting position. In other embodiments, the control circuit 504 may operate only to drive the actuator 506 following a loss of external power to the hard disk drive. In some such embodiments, the control circuit 504 may include circuitry for detecting when external power to the hard disk drive has been lost.

The control circuit 504 may be implemented in any suitable manner, as embodiments are not limited in this respect. Some hard disk drives that are currently commercially available include circuits to carry out some of the functionality of control circuit 504. Control circuit 504 may, in some embodiments, be implemented using these circuits.

In some embodiments, control circuit 504 may be a processor programmed with instructions that define how the actuator 506 is to be operated over time to move an actuator arm to a resting position. The processor may then be configured to execute the instructions upon detecting a loss of external power. For example, in some embodiments the processor may be programmed with instructions defining how the actuator 506 is to be braked until the actuator arm stops moving or reaches a certain speed, instructions defining how the actuator 506 is to be driven until the actuator arm reaches a bottom end of a ramp leading to the resting position, and instructions defining how the actuator 506 is to be driven up the ramp until the arm reaches the resting position. In some embodiments, the processor may be adapted to receive feedback from the actuator 506 that is indicative of a current position or state of the actuator arm. The input may be in the form of, for example, a back-electromotive-force of the actuator 506 or a voltage $V_{bemf}$ indicative of this force. For example, the processor may receive as input an indication of a direction of movement and speed of movement of the actuator arm and determine based on the direction and speed how much to brake the actuator 506 or may brake the actuator 506 until the input indicates a direction/speed that is appropriate for moving the actuator arm toward the resting position. As another example, the processor may be adapted to receive input indicative of a speed of the actuator arm and determine, after the actuator arm has been driven some distance and the speed of the actuator arm is zero, that the actuator arm has reached the resting position.

The actuator 506 may also be implemented in any suitable manner, as embodiments are not limited in this respect. In some embodiments, as in some currently-commercially-available hard disk drives, the actuator 506 may be implemented using a voice coil motor (VCM). Though, any other suitable motor may be used in other embodiments. The actuator 506 may be used during operation of a hard disk drive to move an actuator arm to different locations to read data from different portions of one or more platters. In the context of the circuit 500, the actuator 506 is controlled by the control circuit 504, following loss of external power to the hard disk drive, to move the actuator arm to a resting position.

Techniques for providing power to the control circuit 504 and actuator 506 are discussed below in connection with the control circuit 512.

As illustrated in FIG. 5, the circuit 500 also includes a spindle motor 508. During operation of the hard disk drive, the spindle motor 508 is used to rotate platters to enable information to be read from or written to different parts of the platters. Following a loss of external power to the hard disk drive, however, the spindle motor 508 may be used as a power source for the circuit 500.

The spindle motor 508 may be implemented in any suitable manner, as embodiments are not limited in this respect. In FIG. 5, spindle motor 508 is illustrated as the DC equivalent of a spindle motor. It should be appreciated that spindle motor 508 may be implemented as any suitable motor or other mechanism for driving one or more platters, as embodiments are not limited in this respect. In some embodiments, spindle motor 508 may be implemented as a three-phase motor. An example of one way which the spindle motor 508 may be implemented, including circuitry for driving a motor and for recovering power from a motor, may be implemented is discussed in U.S. patent application Ser. No. 12/505,822, filed Jul. 20, 2009, and titled "Management of Disk Drive During Power Loss" ("the '822 Application"). The '822 Application is incorporated by reference herein in its entirety and at least for its discussion of driving a motor using a three-phase drive signal and drawing power from the motor that is generated from a back-electromotive-force of the motor. Electrical characteristics of the motor 508 (and/or electrical characteristics of components of circuitry that drive the motor and may be used to recover power from the motor) are illustrated in simplified form in FIG. 5 as components 510A, 510B. The components 510A, 510B represent, respectively, the resistance and capacitance of the motor 508 (and/or of components of circuitry for driving the motor or recovering power therefrom).

As discussed above, following loss of external power to the hard disk drive, the control circuit 504 operates the actuator 506 to move an actuator arm to a resting position to prevent damage to the hard disk drive. The control circuit 504 and actuator 506 may, following the loss of external power, be powered using power drawn from the energy storage device 502 and/or power drawn from the spindle motor 508. The control circuit 512 of FIG. 5 regulates how the control circuit 504 and actuator 506 are powered following the loss of external power.

In the embodiment of FIG. 5, following a loss of external power, the control circuit 512 may draw power from the energy storage device 502 and provide that power to the control circuit 504 for powering the control circuit 504. Additionally, the control circuit 512 may draw power from the spindle motor 508 and provide that power to the actuator 506 for powering the actuator 506. The control circuit 512 may also determine whether to provide power drawn from the spindle motor 508 to the energy storage device 502 to charge the energy storage device and may, in some (but not all) embodiments determine whether to provide power drawn from the energy storage device 502 to the actuator 506. The control circuit 512 may make these determinations in any suitable manner. In some embodiments, the control circuit 512 may make one or both of these determinations by evaluating an amount of power that is to be consumed by the actuator 506 at a time and an amount of power that can be drawn from the spindle motor 508 at the time.

As mentioned above, the control circuit 504 may, over time, vary an amount of power that is to be consumed by the actuator 506 for driving the actuator arm. For example, the control circuit 504 may cause the actuator 506 to consume more power when the actuator 506 is to drive the actuator arm up the ramp to the resting position. As also mentioned above, an amount of power that can be drawn from the spindle motor 508 may vary over time, as the platters slow. In some embodiments, therefore, at a given time the control circuit 512 may determine an amount of power that is to be consumed by the actuator 506 and determine an amount of power that can be drawn from the spindle motor 508 at that time. The control circuit 512 may then compare the amounts of power and take one or more actions based on the result of the comparison.

For example, in some embodiments the control circuit 512 may determine whether the amount of power that is to be consumed by the actuator 506 exceeds the amount of power that can be drawn from the spindle motor 508 at a time. In that case, the spindle motor 508 alone will not be sufficient for powering the actuator 506. Accordingly, in this case, the control circuit 512 may draw energy from the energy storage device 502 to provide to the actuator 506, such that the actuator 506 is powered using power drawn from the energy storage device 502 and power drawn from the spindle motor 502.

As another example, in some embodiments the control circuit 512 may determine whether the amount of power that is to be consumed by the actuator 506 is less than the amount of power that can be drawn from the spindle motor 508 at a time. In that case, the spindle motor 508 will output at the time excess energy that will not be consumed by the actuator 506. However, at a later time, the actuator 506 may consume more power than can be drawn from the spindle motor 508 at the later time. At that later time, it would be advantageous if the power available from the spindle motor 508 could be supplemented with power available from the energy storage device 502, as discussed in the preceding paragraph. Accordingly, when the amount of power to be consumed by the actuator 506 at a time is less than the amount of power that can be drawn from the spindle motor 508 at the time, the excess power available from the spindle motor 508 may be stored in the energy storage device 502. Thus, the control circuit 512 may, in this case, charge the energy storage device 502 with power drawn from the spindle motor 508.

The control circuit 512 may be implemented in any suitable manner, as embodiments are not limited in this respect. For example, while the control circuit 512 is illustrated in FIG. 5 as a separate component of the circuit 500 from the control circuit 504, in some embodiments the circuits 504, 506 may be implemented as one component.

Figure 6:
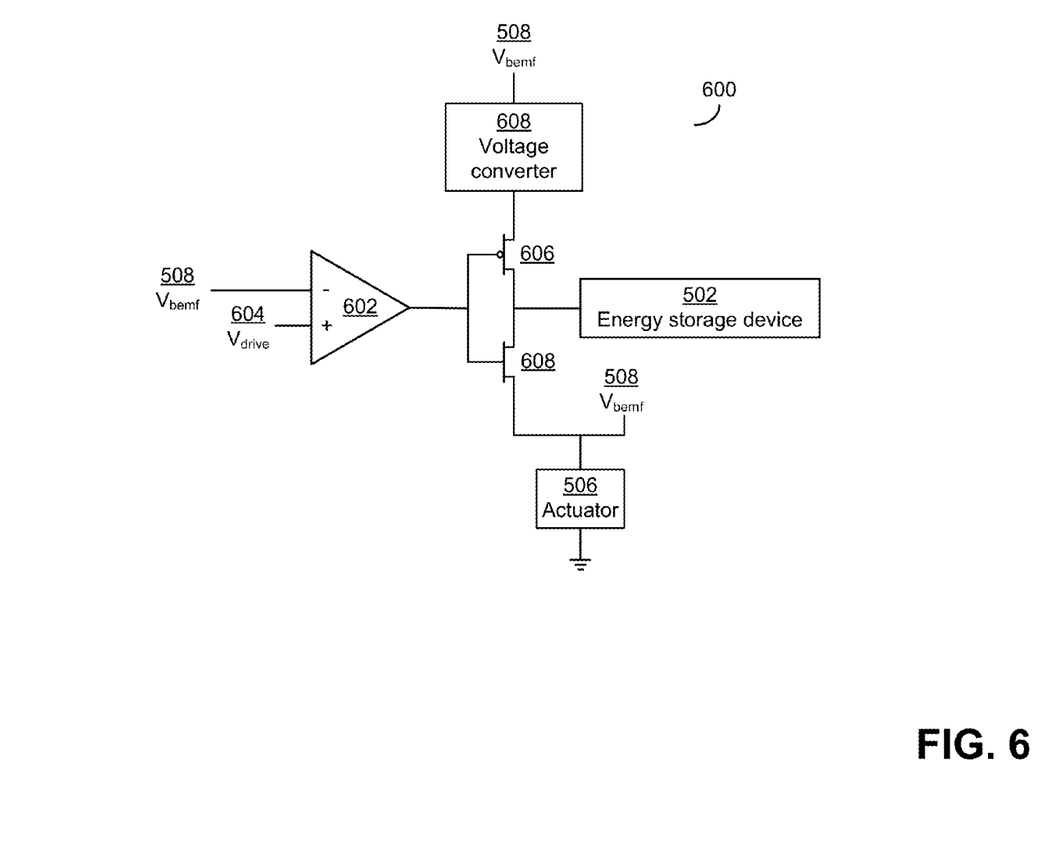
FIG. 6 is a diagram of an exemplary circuit that may be used in some embodiments for comparing a power that can be drawn from a spindle motor at a time to an amount of power to be used at the time for driving an actuator and, based on the comparison, regulating a provision of power drawn from the spindle motor.

FIG. 6 illustrates an example of a way in which the control circuit 512 may be implemented in some embodiments. For ease of description and illustration, FIG. 6 illustrates the control circuit in a simplified manner, focusing on an arrangement of major components of this embodiment of the control circuit 600. Those skilled in the art will appreciate that other electrical components not illustrated in FIG. 6, such as resistors, may be included in implementations in accordance with these embodiments.

The control circuit 600 of FIG. 6 includes a comparator 602 that compares a voltage $V_{bemf}$ indicative of a power available from the spindle motor 508 at a time to a voltage $V_{drive}$ 604 indicative of an amount of power to be consumed by the actuator 506 at the time. The comparator 602 produces a value indicative of relative values of the voltages 508 and 604: a logic high voltage if the voltage 604 exceeds the voltage 508 and a logic low voltage if the voltage 604 is less than the voltage 508. The signal produced by the comparator 602 is provided to switches 606, 608. The switches 606, 608 may be implemented in any suitable manner, as embodiments are not limited in this respect. In FIG. 6, the switches 606, 608 are illustrated as transistors.

The switch 606 controls how power is provided to the energy storage device 502. In particular, the switch 606 controls whether power drawn from the spindle motor 508 is used to charge the energy storage device 502. When the comparator 502 outputs a logic low signal, indicating that the power that can be drawn from the spindle motor 508 exceeds the amount of power to be consumed by the actuator 506 at a time, the comparator 602 renders the switch 606 conductive such that power drawn from the spindle motor 508 can flow to and charge the energy storage device 502. In the embodiment of FIG. 6, the control circuit 600 additionally includes a voltage converter 608 disposed between the spindle motor 508 and the energy storage device 502. The voltage converter 608 may be implemented as any suitable voltage converter, as embodiments are not limited in this respect. The voltage converter 608 serves to convert a power produced by the spindle motor 508 prior to the power being used to charge the energy storage device 502. This may be done in some embodiments such that the energy storage device 502 is charged to an appropriate level for powering the control circuit 504 and actuator 506. For example, in some embodiments the power that can be drawn from the spindle motor 508 may have a voltage of approximately 1 volt, but the control circuit 504 may require a power of approximately 4 volts for proper operation. In this case, the voltage converter 608 may up-convert the power drawn from the spindle motor 508 such that the energy storage device 502 will output the power of approximately 4 volts. It should be appreciated, however, that embodiments are not limited to including a voltage converter.

The switch 608 controls how power is provided to the actuator 506. As illustrated in FIG. 6 (and as discussed above) the actuator 506 is powered with power drawn from the spindle motor 508. At times, the actuator 506 may additionally be powered with power drawn from the energy storage device 502. Accordingly, when the comparator 602 produces a logic high signal that indicates that the power available from the spindle motor 508 is less than the power that is to be consumed by the actuator 506 and is therefore insufficient to power the actuator 506, the comparator 602 renders the switch 608 conductive and thereby electrically couples the actuator 506 to the energy storage device 502. Power can then flow from the energy storage device 502 to the actuator 506.

The switches 606, 608 may be opened and closed out of phase with one another, such that switch 606 is closed when switch 608 is open and vice versa. Thus, the circuit 600 may prevent (by opening switch 608) power from being drawn from the energy storage device 502 to power the actuator 506 when (due to switch 606 being closed) the energy storage device 502 is being charged with power drawn from the spindle motor 508. Similarly, the circuit 600 may prevent (by opening switch 606) power drawn from the spindle motor 508 from charging the energy storage device 502 when (due to switch 608 being closed) power is being drawn from the energy storage device 502 to power the actuator 506.

It should be appreciated that the circuit 600 of FIG. 6 is merely an example of ways in which a circuit to regulate provision of power in a hard disk drive following a loss of power can be implemented. Other circuits are possible. For example, in some embodiments, the control circuit 512 of FIG. 5 may be implemented as a programmed processor. Such a programmed processor may, for example, accept input of the power that is available from the spindle motor 508 via an analog-to-digital converter. The programmed processor may also determine a digital value representative of the power to be consumed by the actuator 506 at a time and compare the digital values, then regulate power according to the result of the comparison.

As another example, in some embodiments in which the control circuit 512 of FIG. 5 is implemented as a programmed processor, the control circuit 512 may regulate a provision of power in the circuit 500 without comparing the power available from the spindle motor 508 to the power to be consumed by the actuator 506. In some such embodiments, the power that is available from a spindle motor 508 following a loss of external power may be consistent and predictable each time external power is lost. Additionally, the power to be consumed by the actuator 506 may be consistent and predictable each time external power is lost. In these embodiments, the programmed processor may be programmed based on information regarding an amount of power that is anticipated to be available from the spindle motor 508 and power that is anticipated to be consumed by the actuator 506. The programmed processor may, in some such embodiments, compare pre-programmed values regarding predicted amounts of power when determining how to regulate a provision of power in the circuit following a loss of external power. In other embodiments, however, the programmed processor may be programmed to regulate power in particular ways at particular times, without performing a comparison. The programmed processor may be pre-programmed to, at a time that the actuator 506 is to be controlled to draw a certain amount of power, regulate power in a certain way based on that certain amount of power. For example, based on the knowledge that, at that time, the spindle motor 508 will not alone provide enough power to drive the actuator 506, the programmed processor may be also programmed with instructions to close a switch such that the energy storage device provides power to the actuator 506. In this case, the programmed processor may be programmed to execute the instructions to close the switch without first evaluating an amount of power available, or predicted to be available, from the spindle motor.

In embodiments in which the control circuit is implemented at least in part as a programmed processor, the programmed processor may be powered using power drawn from the energy storage device 502. It should be appreciated that, in embodiments in which the control circuit is implemented as a programmed processor, any suitable processor (including any suitable circuit for executing instructions) may be used, as embodiments are not limited in this respect.

Figure 7:
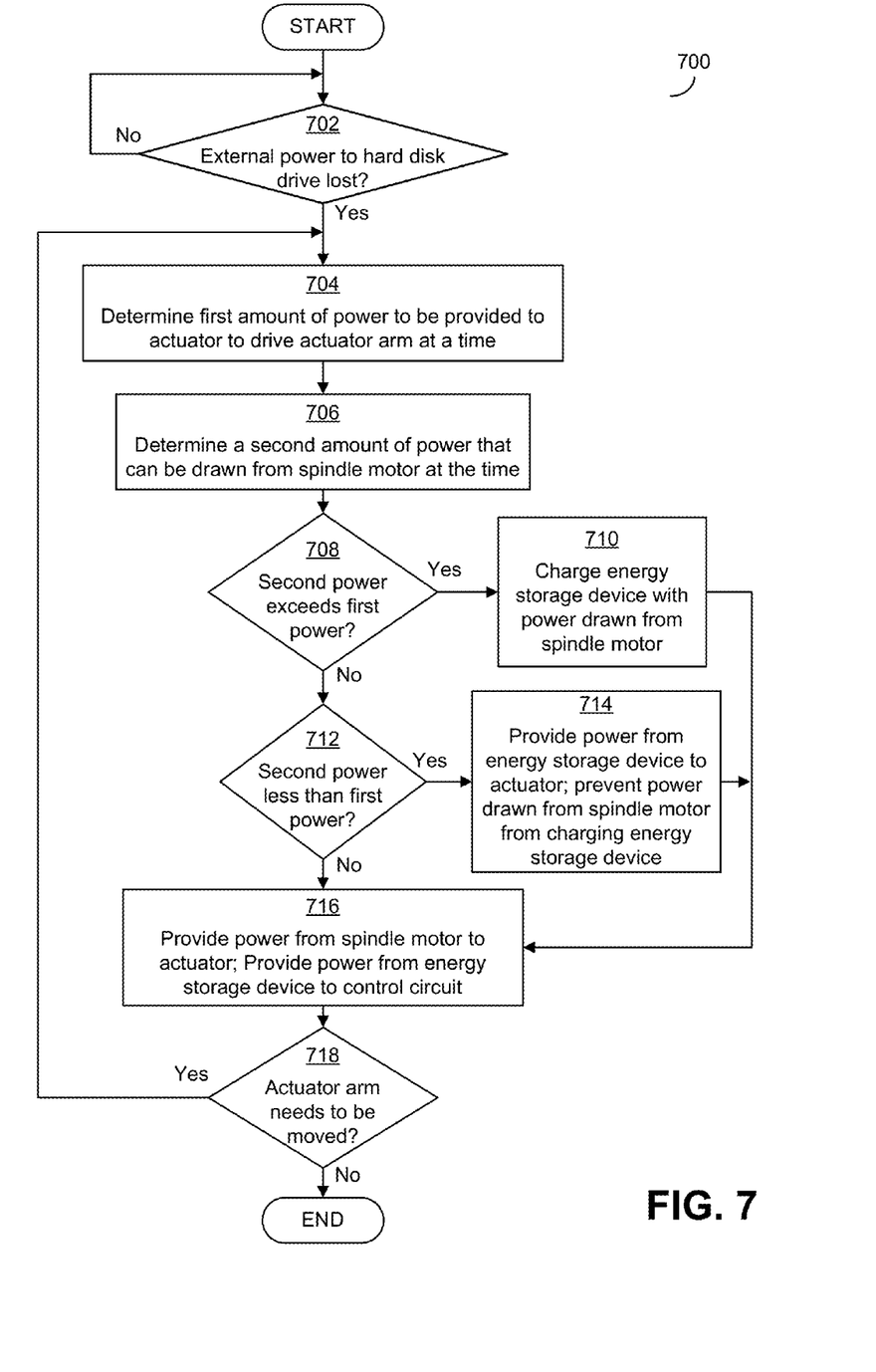
FIG. 7 is a flowchart of an exemplary method that may be carried out in some embodiments for selecting a way in which to provide power to an actuator based on a power that is to be used to drive the actuator at the time.

Embodiments may operate in any suitable manner to determine how to regulate the provision of power in the hard disk drive following a loss of external power to the hard disk drive. FIG. 7 is a flowchart showing one example of a way in which a hard disk drive may operate to provide power to an actuator and a control circuit following a loss of external power to a hard disk drive. The process 700 of FIG. 7 is described below as being carried out by the hard disk drive, though it should be appreciated that the process 700 may be carried out by any suitable component(s) of a hard disk drive or any suitable component or device operating in connection with a hard disk drive, as embodiments are not limited in this respect. For example, a processor may be programmed with instructions that, when executed by the processor, cause the processor to carry out the process 700.

Prior to the start of the process 700 of FIG. 7, the hard disk drive is connected to an external power source, such as a battery, alternating-current power network, computing device, or other power source disposed outside of the housing of the hard disk drive. The hard disk operates to rotate the platters of the hard disk and move the actuator arm as part of reading information from and writing information to the hard disk drive.

The process 700 begins in block 702, in which the hard disk drive determines whether a loss of external power to the hard disk drive has been detected. If not loss of power has been detected, the hard disk drive loops back and detects again whether loss of power has been detected. If, however, the hard disk drive determines that a loss of external power has been detected, the hard disk drive continues to block 704.

The loss of external power detected in block 702 may occur under any of various circumstances, such as a blackout in an alternating-current power network, an unplugging of a computing device by a user, or a shutdown of a computing device by a user without the user instructing the computing device to undergo a power transition. The loss may be defected in any suitable manner, such as by a loss of voltage or current to a circuit component.

Following the detection of the loss of external power in block 704, the hard disk drive will take a number of actions to move an actuator arm to a resting position, to prevent damage to magnetic heads and/or platters of the hard disk drives. The actions taken by the hard disk drive include the actions of blocks 704 to 718, which may be repeatedly carried out until the actuator arm reaches the resting position.

In block 704, the hard disk drive determines a first amount of power that is to be provided to an actuator at a time for driving an actuator arm. The hard disk drive may make the determination in any suitable manner, including by reviewing information regarding a manner in which a control circuit of the hard disk drive, which governs operations of the actuator, is to control the actuator at the time. For example, in some embodiments the hard disk drive may review stored information regarding a process for moving the actuator arm to the resting position, where the stored information identifies amounts of power to be provided to the actuator at various times. In some embodiments, the hard disk drive may additionally or alternatively determine a current speed of the actuator arm and determine an amount of power to provide to the actuator to adjust the speed of the actuator arm. For example, the hard disk drive may be programmed to drive the actuator to move the actuator arm at a constant speed until the actuator arm reaches the resting position. To do so, the hard disk drive may provide power to the actuator to move the actuator arm. Then, in block 704, the hard disk drive may stop providing power to the actuator for a short time and during the short time, measure a voltage produced by a back-electromotive-force of the actuator (the $V_{bemf}$ of the actuator) and, from the $V_{bemf}$, deduce a current speed of the actuator arm. If the hard disk drive deduces that the current speed is above the constant speed, the hard disk drive may in block 704 reduce an amount of power provided to the actuator. Conversely, if the hard disk drive deduces that the current speed is below the constant speed in block 704, the hard disk drive may increase an amount of power provided to the actuator.

In block 706, the hard disk drive determines a second amount of power that can be drawn from a spindle motor of the hard disk drive at the time that the actuator is to be powered with the amount of power determined in block 704.

The hard disk drive may determine the second amount of power in block 706 in any suitable manner. In some embodiments, the hard disk drive may review stored information indicating an amount of power that is predicted to be available from the spindle motor at a time. In other embodiments, the hard disk drive may measure the amount of power being output by the spindle motor at the time.

In block 708, once the determinations of block 704 and 706 have been made, the hard disk drive will determine whether the second amount of power (the power available from the spindle motor) exceeds the first amount of power (the amount of power that is to be provided to the actuator). If the second amount exceeds the first amount, the process continues to block 710. In block 710, an energy storage device of the hard disk drive is charged using power drawn from the spindle motor.

If, however, in block 708 the hard disk drive determines that the second amount of power does not exceed the first amount of power, the process 700 continues to block 712. In block 712, the hard disk drive determines whether the second amount of power is less than the first amount of power. If so, then in block 714 the hard disk drive provides power from the energy storage device to the actuator. In block 714, the hard disk drive may also prevent power that is drawn from the spindle motor from charging the energy storage device. The hard disk drive may do this such that power that is drawn from the spindle motor at the time is directed to the actuator and power is not directed away from the actuator to the energy storage device, particularly when power is being drawn from the energy storage device in block 714 to be provided to the actuator. The hard disk drive may prevent the power from charging the energy storage device in any suitable manner, such as by opening a switch that electrically connects the energy storage device to the spindle motor (See, e.g., switch 606 of FIG. 6).

Following blocks 710 or 714, or if the hard disk drive determines in block 712 that the second amount of power is not less than the first amount of power, in block 716 the hard disk drive provides power drawn from the spindle motor to the actuator and provides power from the energy storage device to the control circuit that governs operations of the actuator.

Accordingly, the hard disk drive may either, as a result of blocks 710 and 716, provide power drawn from the spindle motor to the energy storage device and to the actuator or, as a result of blocks 714 and 716, provide power drawn from the energy storage device and from the spindle motor to the actuator.

In block 718, the hard disk drive determines whether the actuator arm is to be moved further. The hard disk drive may make the determination in any suitable manner. For example, the hard disk drive may review stored information regarding a process for moving the actuator arm to the resting position, where the stored information identifies amounts of power to be provided to the actuator over time. In the case that stored information identifies an end of the process for moving the actuator arm, the hard disk drive may determine based on the stored information whether the actuator arm needs to be moved further or if the end of the process has been reached. As another example, the hard disk drive may determine a current speed of the actuator arm, such as by deducing the current speed from a $V_{bemf}$ of the actuator. In the case that the current speed of the actuator arm is 0, the hard disk drive may deduce that actuator arm has reached the resting position and does not need to be moved further. In the case that the current speed is not 0, however, the hard disk drive may deduce that the actuator arm has not reached the resting position and needs to be moved further. If the hard disk drive determines in block 718 that the actuator arm needs to be moved further, the hard disk drive will return to block 704 to determine how to regulate power as the actuator arm is moved further. If, however, the hard disk drive determines in block 718 that the actuator arm does not need to be moved further, the process 700 ends. Following the end of the process 700, the actuator arm is in the resting position and is not over the platters of the hard disk drive. As a result, the actuator arm will not drop onto the platters when the platters stop moving and the movement of air over the platters ceases, and the magnetic heads and platters of the hard disk drive will not be damaged. The actuator arm will stay in the resting position until external power is again applied to the hard disk drive and the hard disk drive can resume normal operation.

Figure 8A:
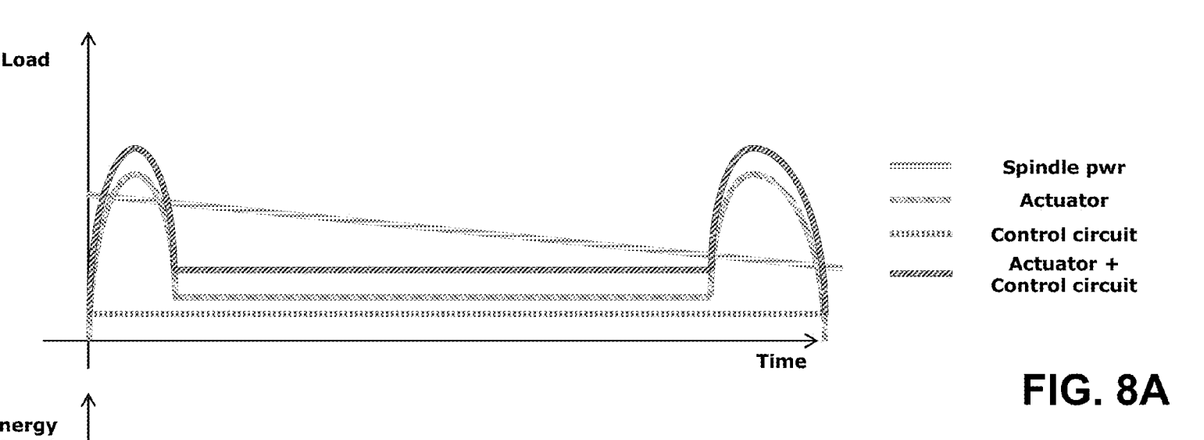
FIG. 8A is a graph of power consumed by an actuator and a control circuit in one embodiment and a manner in which power is provided to the actuator and the control circuit based on the power that is consumed.
Figure 8B:
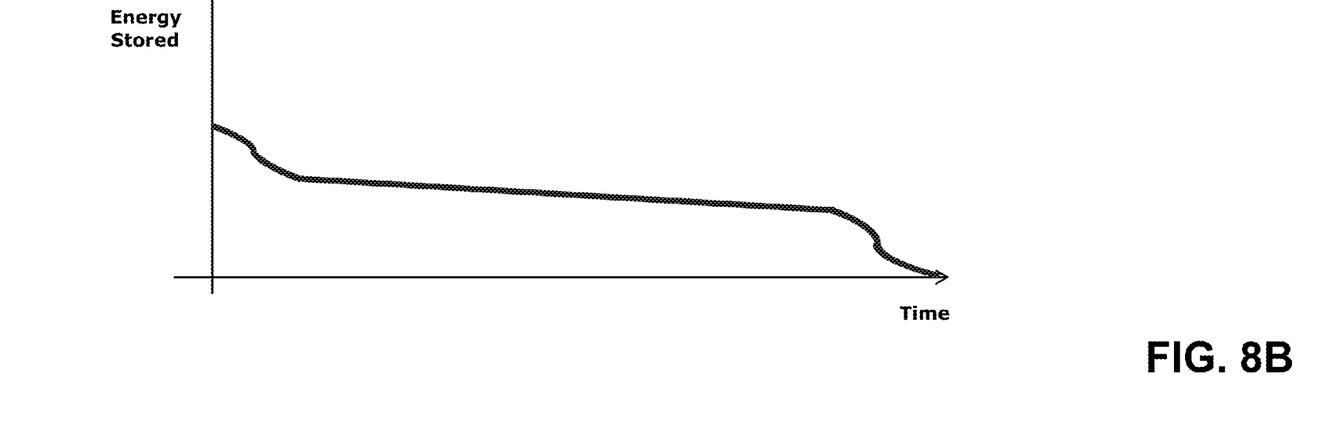
FIG. 8B is a graph of a change in an amount of energy stored in an energy storage device of some embodiments following a loss of external power to a hard disk drive.

FIGS. 8A and 8B provide an illustration of the amounts of power that are available in the hard disk drive and that will be consumed by the hard disk drive over time, following a loss of external power to the hard disk drive. FIG. 8A illustrates the amount of power that is available from the spindle motor over time, as compared with the power that will be consumed by the actuator and the control circuit that governs operations of the actuator over time. As shown in FIG. 8A, the power that will be consumed by the actuator varies over time, with the most power being consumed immediately following the loss of external power, when the actuator is braked until the actuator arm stops moving or reaches a desired speed, and at the end of the process, when the actuator arm is moved up a ramp to the resting position. As shown in FIG. 8A, the power to be consumed by the actuator may, at times, exceed the amount of power that can be drawn from the spindle motor, particularly as the power that can be drawn from the spindle motor drops over time. The combined power needs of the actuator and the control circuit may therefore also exceed, at times, the amount of power that can be drawn from the spindle motor. At other times, however, the combined power needs of the actuator and the control circuit do not exceed the amount of power that can be drawn from the spindle motor. During these other times, as discussed above, the excess power that can be drawn from the spindle motor may be stored in an energy storage device for later use, when the power that can be drawn from the spindle motor is not sufficient. FIG. 8B illustrates a variation in the energy stored in the energy storage device over the time period illustrated in FIG. 8A. As can be seen from comparing FIGS. 8A and 8B, during the times when the combined power needs of the actuator and the control circuit exceed the amount of power that can be drawn from the spindle motor (and thus during the times that power is drawn from the energy storage device to power the actuator), the amount of energy stored in the energy storage device drops relatively quickly. At other times, the amount of energy stored in the energy storage device drops, due to the consumption of power by the control circuit. However, the amount of energy stored drops relatively slowly, because during these other times the energy storage device is also being charged with excess power available from the spindle motor.

Because the energy storage device is, from time to time, charged using excess energy available from the spindle motor, the energy storage device may be implemented using a device that can store less energy than in some alternative techniques. For example, the energy storage device may, in some embodiments, be implemented using a capacitor that is smaller than a capacitor that would have been used if the techniques of FIGS. 2 and 4, discussed above, were used. In such embodiments, because a smaller capacitor can be used, the hard disk drive may on the whole be cheaper and smaller than it may have been if the techniques of FIGS. 2 and 4 were used.

Such alterations, modifications, and improvements are intended to be part of this disclosure, and are intended to be within the spirit and scope of embodiments described herein. Further, though advantages of various embodiments are indicated, it should be appreciated that not every embodiment will include every described advantage. Some embodiments may not implement any features described as advantageous herein and in some instances. Accordingly, the foregoing description and drawings are by way of example only.

The above-described embodiments can be implemented in any of numerous ways. For example, some embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, some of the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of embodiments discussed above. As used herein, the term "computer-readable storage medium" encompasses only a computer-readable medium that can be considered to be a manufacture (i.e., article of manufacture) or a machine. Alternatively or additionally, embodiments may include a computer readable medium that is not a computer-readable storage medium, such as a propagating signal.

The terms "program" or "software" are used herein in a generic sense to refer to any type of computer code or set of executable instructions that can be employed to program a computer or other processor to implement various aspects of embodiments discussed above. Additionally, it should be appreciated that according to one aspect of this embodiment, one or more computer programs that when executed perform methods described herein need not reside on a single computer or processor, but may be distributed in a modular fashion amongst a number of different computers or processors to implement various aspects of some embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of some embodiments may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments may be implemented as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art.

What is claimed is:

1. A method of operating a hard disk drive in response to a loss of external power to the hard disk drive, the hard disk drive including a spindle motor to drive rotation of a plurality of platters, the hard disk drive further including an actuator to drive an actuator arm and a control circuit to control the actuator, the hard disk drive further including an energy storage device, the method comprising:

determining a first amount of power to be used by the actuator for driving the actuator arm at a time; and when a second amount of power that can be drawn from the spindle motor at the time is greater than the first amount of power to be used by the actuator for driving the actuator arm at the time, charging the energy storage device with power drawn from the spindle motor.

2. The method of claim 1, further comprising:

when the second amount of power that can be drawn from the spindle motor at the time is less than or equal to the first amount of power to be used by the actuator for driving the actuator arm at the time, preventing power drawn from the spindle motor at the time from being used to charge the energy storage device.

3. The method of claim 2, further comprising:

powering the control circuit that controls the actuator with power drawn from the energy storage device.

4. The method of claim 3, further comprising:
when the second amount of power that can be drawn from the spindle motor at the time is less than the first amount of power to be used for driving the actuator arm at the time, driving the actuator using power drawn from the spindle motor and power drawn from the energy storage device.

5. The method of claim 1, further comprising, prior to the determining and the charging:
detecting the loss of external power to the hard disk drive.

6. The method of claim 1, wherein charging the energy storage device with power drawn from the spindle motor comprises:
closing at least one switch to electrically connect the spindle motor to the energy storage device.

7. The method of claim 6, wherein closing the at least one switch comprises:
measuring the second amount of power that can be drawn from the spindle motor at the time;
comparing the second amount of power to the first amount of power; and
when the second amount of power exceeds the first amount of power, closing the at least one switch.

8. A method of operating a hard disk drive in response to a loss of external power to the hard disk drive, the hard disk drive including a spindle motor to drive rotation of a plurality of platters, the hard disk drive further including an actuator to drive an actuator arm and a control circuit to control the actuator, the hard disk drive further including an energy storage device, the method comprising:
comparing a first amount of power to a second amount of power, the first amount of power being an amount of power to be used by the actuator for driving the actuator arm at a time, the second amount of power being an amount of power that can be drawn from the spindle motor at the time;
when the second amount of power is greater than or equal to the first amount of power, powering the actuator using power drawn from the spindle motor; and
when the second amount of power is less than the first amount of power, powering the actuator using power drawn from the spindle motor and from the energy storage device.

9. The method of claim 8, further comprising:
when the second amount of power is greater than or equal to the first amount of power, charging the energy storage device with power drawn from the spindle motor at the time; and
when the second amount of power does not exceed the first amount of power, preventing power drawn from the spindle motor at the time from being used to charge the energy storage device.

10. The method of claim 9, further comprising:
repeating the comparing and powering a plurality of times over a time period, wherein the amount of power to be used by the actuator for driving the actuator arm changes over the time period.

11. A hard disk drive comprising:
a power input to receive power from a power source;
a plurality of platters;
a spindle motor to drive rotation of the plurality of platters;
an actuator arm having, at one end, at least one device to read data from and/or write data to the plurality of platters;
an actuator to drive movement of the actuator arm;
a first control circuit to control operation of the actuator;
an energy storage device; and
a second control circuit configured to select whether to drive the actuator using power drawn from the spindle motor or using power drawn from the spindle motor and power drawn from the energy storage device, in response to a loss of power from the power source.

12. The hard disk drive of claim 11, wherein the second control circuit is configured to:
determine a first amount of power to be used by the actuator for driving the actuator arm at a time; and
when a second amount of power that can be drawn from the spindle motor at the time is greater than the first amount of power to be used by the actuator for driving the actuator arm at the time, charge the energy storage device with power drawn from the spindle motor.

13. The apparatus of claim 12, wherein the second control circuit is configured to:
when the second amount of power that can be drawn from the spindle motor at the time is less than or equal to the first amount of power to be used by the actuator for driving the actuator arm at the time, prevent power drawn from the spindle motor at the time from being used to charge the energy storage device; and
when the second amount of power that can be drawn from the spindle motor at the time is less than the first amount of power to be used for driving the actuator arm at the time, drive the actuator using power drawn from the spindle motor and power drawn from the energy storage device.

14. The apparatus of claim 11, wherein the second control circuit is configured to:
compare a first amount of power to a second amount of power, the first amount of power being an amount of power to be used by the actuator for driving the actuator arm at a time, the second amount of power being an amount of power that can be drawn from the spindle motor at the time;
when the second amount of power exceeds the first amount of power, charge the energy storage device with power drawn from the spindle motor at the time.

15. The apparatus of claim 11, wherein the second control circuit comprises:
at least one comparator arranged to compare a first signal to a second signal, the first signal indicating a first amount of power to be used by the actuator for driving the actuator at a time, the second signal indicating a second amount of power that can be drawn from the spindle motor at the time.

16. The apparatus of claim 15, wherein:
the second control circuit comprises at least one first switch;
the at least one first switch electrically connects the spindle motor to the energy storage device; and
the second control circuit is arranged such that a state of the at least one first switch is controlled based at least in part on an output of the at least one comparator.

17. The apparatus of claim 11, wherein the energy storage device is electrically connected to the first control circuit.

18. The apparatus of claim 11, wherein:
the energy storage device is connected to the first control circuit via at least one first switch; and
the spindle motor is connected to the energy storage device via at least one second switch.

19. The apparatus of claim 11, wherein the first control circuit and/or the second control circuit is configured to detect the loss of external power to the hard disk drive.

20. An apparatus for use in an environment comprising a hard disk drive, the apparatus comprising:
a control circuit arranged to provide power to an actuator for driving an actuator arm, wherein the control circuit is arranged to select between providing the actuator with power drawn from a spindle motor and providing the actuator with power drawn from the spindle motor and from an energy storage device.

21. The apparatus of claim 20, wherein the control circuit is configured to select at least in part by:
- determining a first amount of power to be used by the actuator for driving the actuator arm at a time;
- determining a second amount of power that can be drawn from the spindle motor at the time;
- when the second amount of power that can be drawn from the spindle motor at a time is less than or equal to the first amount of power to be used by the actuator for driving the actuator arm at the time, providing the actuator with power drawn from the spindle motor and not providing the actuator with power drawn from the energy storage device; and
- when the second amount of power that can be drawn from the spindle motor at the time is less than the first amount of power to be used for driving the actuator arm at the time, providing the actuator with power drawn from the spindle motor and with power drawn from the energy storage device.

22. The apparatus of claim 21, wherein the control circuit is further configured to:
- when the second amount of power that can be drawn from the spindle motor at the time is greater than the first amount of power to be used by the actuator for driving the actuator arm at the time, charging the energy storage device with power drawn from the spindle motor.

23. The apparatus of claim 20, wherein the second control circuit is configured to:
- compare a first amount of power to a second amount of power, the first amount of power being an amount of power to be used by the actuator for driving the actuator arm at a time, the second amount of power being an amount of power that can be drawn from the spindle motor at the time;
- when the second amount of power exceeds the first amount of power, charge the energy storage device with power drawn from the spindle motor at the time.

24. The apparatus of claim 20, wherein the control circuit comprises:
- a switch to electrically connect the energy storage device to the spindle motor;
- a first node to accept a first voltage indicative of a power that can be drawn from the spindle motor at a time;
- a second node to accept a second voltage indicative of a power that is to be consumed by the actuator at the time; and
- a comparator electrically connected to the switch such that an output of the comparator controls a state of the switch, wherein the comparator is arranged to compare the first voltage and the second voltage to determine the output.

25. The apparatus of claim 20, wherein the control circuit comprises at least one programmed processor programmed to select between providing the actuator with power drawn from the spindle motor and providing the actuator with power drawn from the spindle motor and from the energy storage device.

26. The apparatus of claim 25, wherein:
- the control circuit further comprises at least one storage medium storing first information indicative of an expected power available from the spindle motor over time and second information indicative of an expected power to be consumed by the actuator over time; and
- the at least one programmed processor is programmed to select between providing power drawn from the spindle motor and providing power drawn from the spindle motor and from the energy storage device based at least in part on evaluating the first information and the second information.

27. The apparatus of claim 25, wherein the control circuit comprises at least one programmed processor programmed to make the selection by, at a first time, executing at least one first instruction that causes the actuator to be provided with power drawn from the spindle motor and, at a second time, executing at least one second instruction that causes the actuator to be provided with power drawn from the spindle motor and from the energy storage device.

28. The apparatus of claim 20, wherein the control circuit is arranged to, at a plurality of times, select between providing, at a time, the actuator with power drawn from the spindle motor and providing the actuator with power drawn from the spindle motor and from the energy storage device.

29. An apparatus for use in an environment comprising a hard disk drive, the apparatus comprising:
- a control circuit arranged to determine a first amount of power to be used by an actuator for driving an actuator arm at a time and to, in a case that a second amount of power that can be drawn from a spindle motor at the time is greater than the first amount of power to be used by the actuator for driving the actuator arm at the time, charge an energy storage device with power drawn from the spindle motor.

30. A circuit for regulating a distribution of power in a hard disk drive, the circuit comprising:
- a power input to receive power generated by a first motor of the hard disk drive;
- an energy storage device;
- a first output to output power to a control circuit that controls a second motor of the hard disk drive, the control circuit being electrically connected to the energy storage device;
- a second power output to output power to the second motor, the second power output being electrically connected to the power input;
- a first switch electrically connected between the energy storage device and the second output such that, when the first switch is closed, power from the energy storage device will be output via the second power output; and
- at least one circuit element to control a state of the first switch.

31. The circuit of claim 30, further comprising:
- a second switch electrically connected between the power input and the energy storage device such that, when the second switch is closed, power that is input via the power input charges the energy storage device,
- wherein the at least one circuit element controls a state of the second switch.

32. The circuit of claim 31, wherein the at least one circuit element is arranged to control the state of the first switch and the state of the second switch such that the first switch is conductive when the second switch is nonconductive and the first switch is nonconductive when the second switch is conductive.

33. The circuit of claim 31, wherein the at least one circuit element comprises a comparator.

34. The circuit of claim 31, wherein the at least one circuit element comprises a processor.

35. The circuit of claim 31, further comprising:
- a voltage converter electrically connected between the power input and the second switch.

* * * * *